JOHN MÜLLER, OF PHILADELPHIA, PENNSYLVANIA.

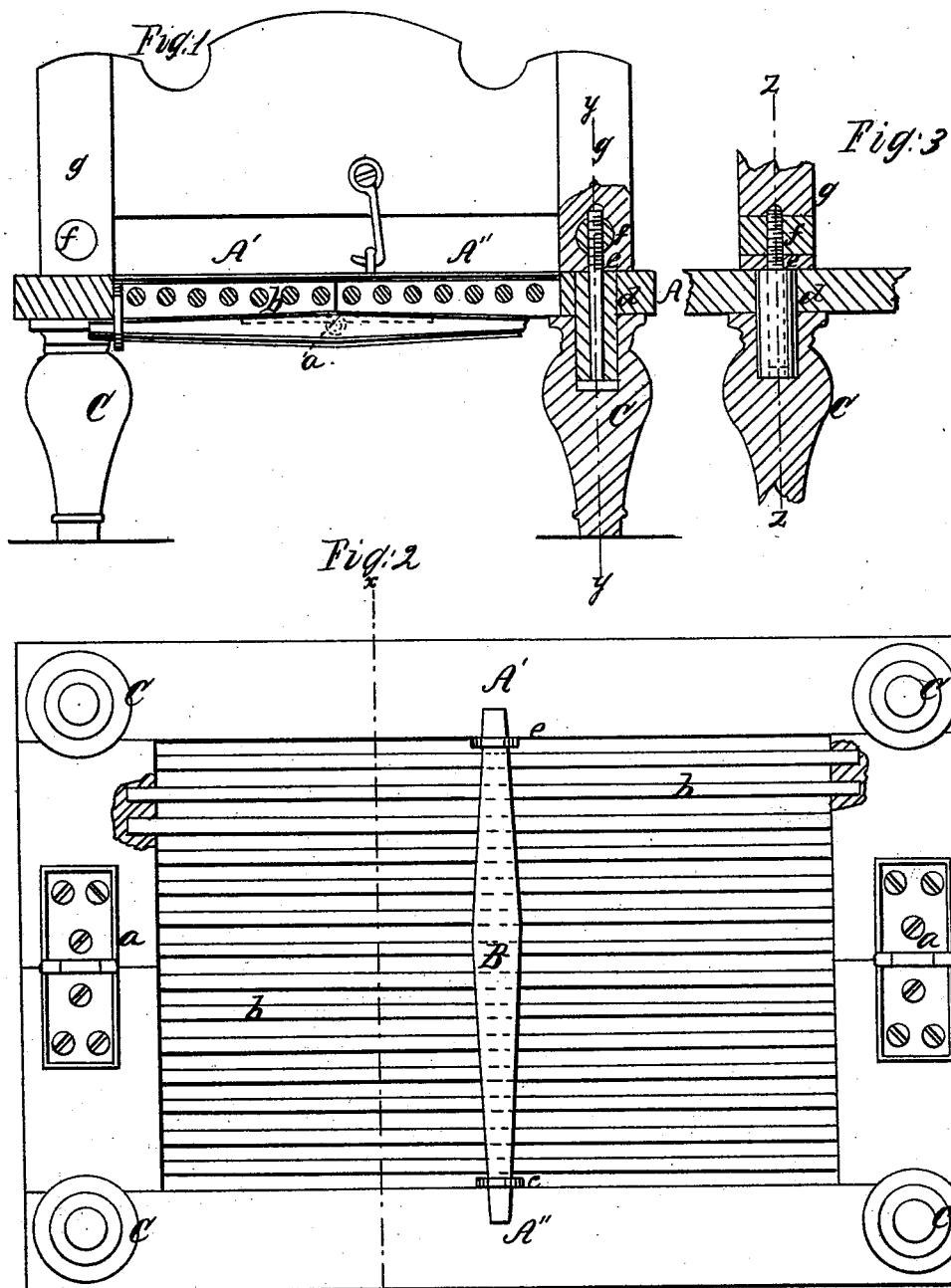

Letters Patent No. 88,977, dated April 13, 1869.

IMPROVED FOLDING-BEDSTEAD.

The Schedule referred to in these Letters Patent and making part of the same.

*To all whom it may concern:*

Be it known that I, JOHN MÜLLER, of the city and county of Philadelphia, Pennsylvania, have invented certain new and useful Improvements in Bedsteads; and I do hereby declare the following to be a full, clear, and exact description thereof, sufficient to enable those skilled in the art to which my invention appertains, to fully understand the same, reference being had to the accompanying drawings, forming part of this specification, and in which—

Figure 1 is a transverse sectional view, taken in the line $x\ x$, fig. 2, one leg being shown in section, through the line $z\ z$, in fig. 3;

Figure 2 is an inverted plan view of my bedstead; and

Figure 3 is a detached sectional view, the plane of section being indicated by the line $y\ y$, fig. 1.

My invention consists in the construction and arrangement of parts, as hereinafter more fully described.

In the drawings, similar letters of reference indicate corresponding parts in the several figures.

The frame A, which supports the bedding, is, in this instance, made in two sections, A' A", connected together by hinges $a\ a$, so that it may be folded up for convenience in transportation.

I wish it understood, however, that my other improvements (to be hereinafter described) may be applied to frames which are not adapted to be folded.

I have shown my bed-bottom, composed of longitudinal slats $b$, fixed in the end-pieces of the frame A, as clearly shown in fig. 2.

These slats may be either round or flat, and they may be made of flexible wood, so as to form an elastic, or spring-bed bottom.

These slats are permanently fixed, to prevent the entrance of vermin.

Being made of wood, these slats naturally possess more or less elasticity, and may be used whether the frame A be made in one piece, or in hinged sections.

Removable slats, or any other form of bed-bottoms may be used in lieu of these fixed slats.

When the frame A is made in sections, I employ a cross-bar, B, to strengthen the hinge-joint.

This bar is removably fitted in eyes $c\ c$, which are pivoted to the inner faces of the side-pieces of the frame A, so that they may be turned up, out of the way, in packing the bedstead for transportation.

The legs C may be made hollow, as shown in figs. 1 and 2, to receive a cylindrical wooden block $d$, which projects upward.

In each block $d$ is set a projecting-pin, or rod $e$, whose upper portion is screw-threaded.

These blocks $d$ fit holes, made through the corners of the frame A, and the rods $e$ are screwed transversely into nuts $f$, which are embedded in the side-pieces $g$ of the head and foot-boards of the bedstead.

A modification of this fastening (especially applicable to trundle-bedsteads) consists in providing the end-pieces $g$ with projections $d$, and screw-rods $e$, and embedding the nuts $f$ in the legs.

To render the bedstead still more firm, I prefer to connect the head and foot-boards with the frame A, by means of hooks and eyes, as shown in fig. 1, or their equivalents.

I desire to state that this mode of fastening the legs may be employed when the frame A is made in one piece, and when its construction is somewhat different from that shown and described.

To take apart my improved bedstead, the legs are detached by unscrewing them, the hooks disengaged from the eyes, the head and foot-boards removed, and the bar B detached.

The frame A, if made in sections, may then be folded together, the eyes $c$ being swung out of the way, and all the parts packed together in a small compass.

To put up the bedstead, the manipulation above described, is reversed.

Constructed as above described, a neat, simple, and durable bedstead is produced, which is not liable to get out of order, and which may, if desired, be made in cheap style.

The facility with which the bedstead may be taken apart, packed in a small compass, and transported, is among its chief advantages.

I am aware that the parts of bedsteads have been connected together by means of screws, working through embedded nuts, therefore, I do not claim this feature.

I am also aware that the mattress-frame has been held between the head and the foot-boards or sections, and the legs, by means of screws fixed in the upper ends of said legs, and screwed through said mattress-frame, into the head and foot-boards, or sections, as in my case, therefore, I do not claim this feature; but What I do claim, and desire to secure by Letters Patent, is—

The combination of the detachable head and foot-boards, the legs C, and the folding-frame A A', braced by a removable cross-bar, B, hung in pivoted eyes $c$, and provided with slats, for supporting the mattress, all substantially as herein described.

JOHN MÜLLER.

Witnesses:
 VICTOR HAGMANN,
 HENRY FRIEDRICH.